United States Patent
Herden et al.

(10) Patent No.: US 7,776,298 B2
(45) Date of Patent: Aug. 17, 2010

(54) PROCESS AND DEVICE FOR CLEANING COMBUSTION FLUE GASES

(75) Inventors: Hansjörg Herden, Rodgau (DE); Barbara Roth, Brüssel (BE); Robert Mergler, Frankfurt (DE); Berthold Stegemann, Eschborn (DE); Harald Sauer, Frankfurt am Main (DE)

(73) Assignee: Lentjes GmbH, Ratingen (DE)

( * ) Notice: Subject to any disclaimer, the term of this patent is extended or adjusted under 35 U.S.C. 154(b) by 462 days.

(21) Appl. No.: 10/190,644

(22) Filed: Jul. 8, 2002

(65) Prior Publication Data

US 2003/0019356 A1 Jan. 30, 2003

(30) Foreign Application Priority Data

Jul. 12, 2001 (DE) ................. 101 33 991

(51) Int. Cl.
*B01D 53/52* (2006.01)
(52) U.S. Cl. ............... 423/242.1; 423/240 R; 423/244.01; 423/244.07; 423/244.11
(58) Field of Classification Search ............ 423/240 R, 423/242.1, 244.07, 244.11, 244.01
See application file for complete search history.

(56) References Cited

U.S. PATENT DOCUMENTS

| | | | | |
|---|---|---|---|---|
| 4,115,529 | A * | 9/1978 | Behling ............... | 423/472 |
| 4,201,751 | A * | 5/1980 | Holter et al. ........ | 502/405 |
| 4,388,280 | A * | 6/1983 | Gruzensky et al. .. | 423/131 |
| 4,428,914 | A * | 1/1984 | Brichard et al. ..... | 423/265 |
| 4,539,188 | A * | 9/1985 | Hirsch et al. ........ | 423/210 |
| 4,548,797 | A * | 10/1985 | Sauer et al. ......... | 423/240 R |

(Continued)

FOREIGN PATENT DOCUMENTS

DE 4403244 A1 8/1995

(Continued)

OTHER PUBLICATIONS

Machine Translation of JP 07299328 A.*

(Continued)

*Primary Examiner*—Stanley Silverman
*Assistant Examiner*—Paul Wartalowicz
(74) *Attorney, Agent, or Firm*—Norris, McLaughlin & Marcus

(57) ABSTRACT

The invention relates to a process and a device for the removal of dust, HF, HCl, $SO_2$, $SO_3$, heavy metals, heavy-metal compounds, polyhalogenated hydrocarbons and polycyclic hydrocarbons from combustion flue gases by treating the pollutant-containing combustion flue gases with a sorbent in a circulating fluidized bed. The process is characterized in that the sorbent used is a mixture of $Ca(OH)_2$, at least one naturally occurring zeolite and a carbon-containing substance, in that the treatment of the pollutant-containing combustion flue gases with the sorbent is carried out at from 120 to 180° C. in the presence of water/steam, in that the reactor (3) of the circulating fluidized bed is operated at a gas velocity of from 2 to 10 m/s, a mean residence time of the solids particles in the case of a single pass of from 1 to 10 seconds, and a solids circulation rate of from 10 to 100, where the gas/solid suspension present in the reactor (3) has a mean suspension density of from 1 to 10 kg of solid/$Nm^3$ of flue gas, and in that the removal of the loaded sorbent is carried out by filtration.

10 Claims, 1 Drawing Sheet

U.S. PATENT DOCUMENTS

| | | | | |
|---|---|---|---|---|
| 5,096,680 A | * | 3/1992 | Lindbauer et al. | 423/229 |
| 5,437,691 A | * | 8/1995 | Lauterbach | 23/295 R |
| 5,618,508 A | * | 4/1997 | Suchenwirth et al. | 423/245.1 |
| 5,659,110 A | * | 8/1997 | Herden et al. | 423/219 |
| 5,939,041 A | * | 8/1999 | Lebl | 423/488 |
| 5,985,222 A | * | 11/1999 | Sudduth et al. | 423/235 |
| 6,253,811 B1 | * | 7/2001 | Slagh | 141/383 |
| 6,579,506 B2 | * | 6/2003 | Spink et al. | 423/210 |

FOREIGN PATENT DOCUMENTS

| | | |
|---|---|---|
| DE | 4415719 A1 | 11/1995 |
| DE | 4429027 A1 | 2/1996 |
| DE | 19841513 A1 | 5/1999 |
| EP | 0253563 * | 1/1988 |
| JP | 07299328 A * | 11/1995 |

OTHER PUBLICATIONS

English Language Abstract for DE4403244, Aug. 10, 1995.
English Language Abstract for DE4415719, Nov. 9, 1995.
English Language Abstract for DE4429027, Feb. 22, 1996.
English Language Abstract for DE19841513, May 27, 1999.

* cited by examiner

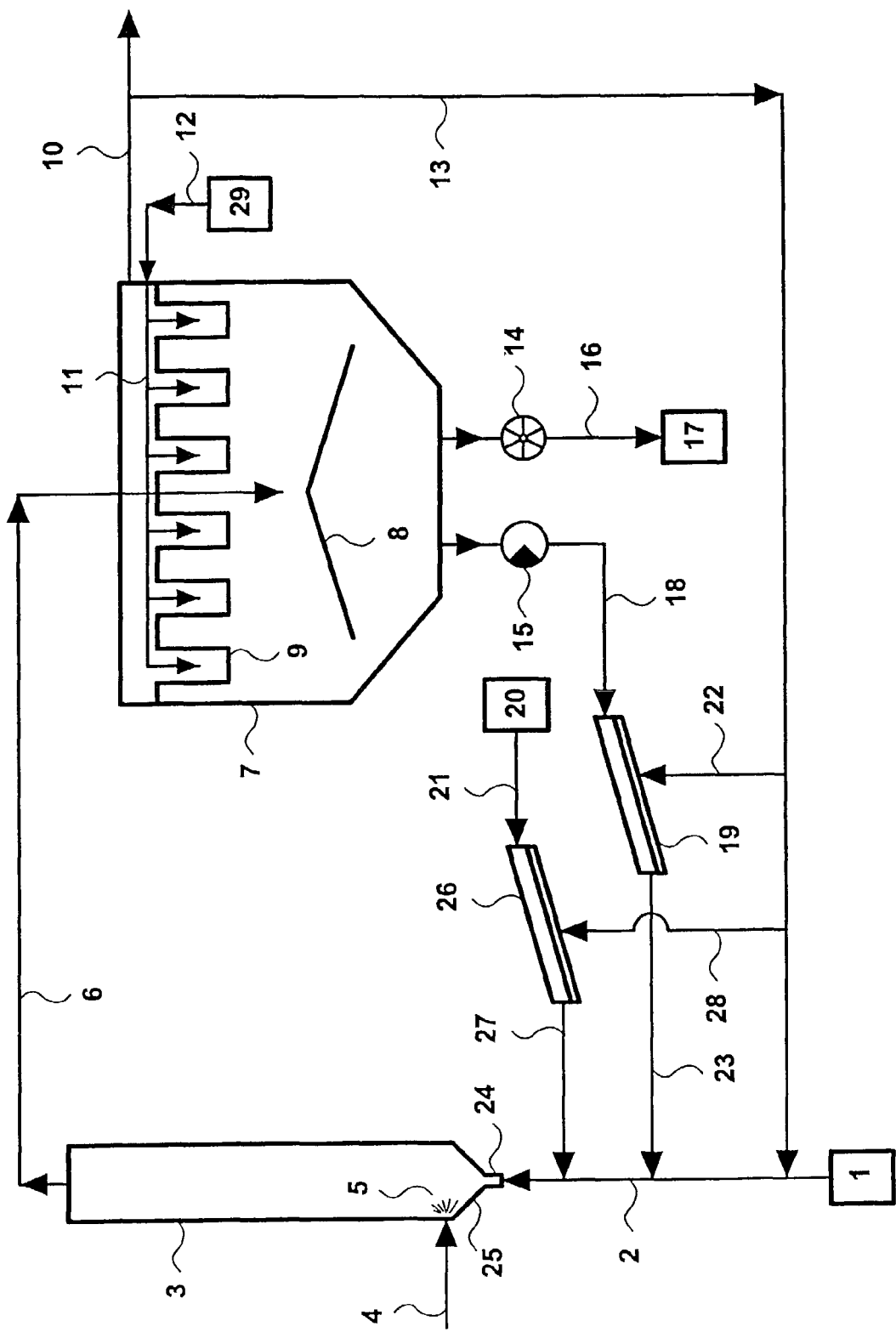

PROCESS AND DEVICE FOR CLEANING COMBUSTION FLUE GASES

The invention relates to a process for the removal of dust, HF, HCl, $SO_2$, $SO_3$, heavy metals, heavy-metal compounds, polyhalogenated hydrocarbons and polycyclic hydrocarbons from combustion flue gases by treating the pollutant-containing combustion flue gases with a sorbent in a circulating fluidized bed consisting of a reactor, a separator and a return line, where the pollutants are bound in the reactor by the sorbent suspended in the gas stream, and the pollutant-loaded sorbent is separated off from the gas/solid suspension in the separator and in part returned to the reactor via the return line and in part discharged. The invention furthermore relates to a device for carrying out the process. The invention finally relates to a preferred use of the process and the device.

In the combustion of fossil fuels, which is carried out with the aim of energy recovery, and in the incineration of refuse, sewage sludge and industrial waste, which is carried out with the aim of waste disposal and energy recovery, flue gases are formed which are contaminated by dust, HF, HCl, $SO_2$, $SO_3$, heavy metals, heavy-metal compounds, polyhalogenated hydrocarbons and polycyclic hydrocarbons, the contaminants being present in the flue gas in different amounts depending on the particular combustion process, and the concentration of the contaminants undergoing certain variations during each combustion process. For example, the different and varying composition of refuse, industrial waste and sewage sludge means that the flue gases formed on combustion of this waste are also contaminated by different amounts of environmentally polluting substances. However, all contaminants must be substantially removed from the flue gases before the latter can be released into the atmosphere, since very many contaminants exert toxic effects on humans, animals and plants even in low concentration.

The dust present in the combustion flue gases in an amount of up to 50 000 mg/Nm³ is separated off in cyclones, electrostatic filters, fabric filters or scrubbers, it also being possible for the flue gas from which dust is to be removed to be passed through a plurality of these apparatuses. The known dust-removal processes today allow residual dust contents of <5 mg/Nm³, even on a large industrial scale. The most substantial dust removal possible is therefore necessary because the dust adsorbs, in particular, toxic heavy metals, heavy-metal compounds, polyhalogenated dibenzodioxins and dibenzofurans, as well as polycyclic hydrocarbons.

$SO_2$ and HCl are each present in the combustion flue gases in an amount of up to 7000 mg/Nm³; in addition, HF and $SO_3$ are each present in amounts of up to 100 mg/Nm³. These gaseous compounds react with the water vapour present in the atmosphere to form acids, which are very frequently in the form of aerosols and have a toxic action. They are therefore substantially separated off, with the known cleaning processes on an industrial scale enabling residual $SO_2$ contents of <20 mg/Nm³, residual HCl contents of <5 mg/Nm³ and residual HF and $SO_3$ contents of <1 mg/Nm³ to be achieved. $SO_2$, HCl, HF and $SO_3$ are separated off using dry, quasi-dry and wet cleaning processes, it also being possible for a plurality of processes to be connected in series. The reactants used in these processes are, in particular, $Ca(OH)_2$, CaO, $CaCO_3$, NaOH and $Na_2CO_3$, these compounds reacting with the gaseous, acidic pollutants with salt formation. Particular importance has been achieved by spray absorption, in which an aqueous suspension of $Ca(OH)_2$ reacts with the acidic pollutants $SO_2$, $SO_3$, HCl and HF, the water is evaporated, and a solid reaction product is formed which also contains dust and other pollutants. In addition, scrubbing processes are known which allow very substantial removal of the above-mentioned acidic pollutants.

The heavy metals and the heavy-metal compounds, in particular mercury, cadmium and arsenic and their compounds, and the polyhalogenated and polycyclic hydrocarbons are present in the flue gases in a lower concentration. However, these substances are extremely toxic and therefore have to be removed from the flue gases virtually quantitatively, which is preferably carried out in accordance with the prior art by adsorption and/or scrubbing processes. Adsorbents which have proven successful are, in particular, activated carbon and zeolites, while the scrubbing processes operate both in the acidic and in the alkaline ranges. The polyhalogenated hydrocarbons can also be removed from the flue gases by catalytic decomposition, while the polycyclic hydrocarbons can also be oxidized by reaction with the oxygen present in the combustion flue gas on an oxidation catalyst to give water and carbon dioxide. The polyhalogenated hydrocarbons present in combustion flue gases are polyhalogenated dibenzodioxins and dibenzofurans, polychlorinated biphenyls, polychlorinated phenols and polychlorinated aromatic compounds, all of which are extremely toxic.

In addition to the above-mentioned pollutants whose removal is a subject-matter of the invention, the combustion flue gases also contain the oxides of nitrogen, i.e. $N_2O$, NO and $NO_2$, which are likewise toxic. These pollutants also have to be removed from the combustion flue gases, which is carried out in accordance with the prior art by, in particular, reaction with $NH_3$, this reaction proceeding either at high temperatures or at lower temperatures on a catalyst with formation of $N_2$ and $H_2O$. The combustion flue gases themselves consist of $N_2$, $CO_2$, $H_2O$ and $O_2$. The source of the nitrogen is predominantly the nitrogen content of the combustion air, while the oxygen present in the combustion flue gases in an amount of from 2 to 12% by volume results from the fact that the combustion is carried out with a stoichiometric excess of oxygen. $CO_2$ and $H_2O$ form on combustion of the carbon or hydrogen present in the fuels with the oxygen present in the combustion air.

The industrial suitability of the known flue gas cleaning processes depends, in particular, on them causing the lowest possible investment and operating costs and that they supply process products which are formed in the lowest possible amount and can either be sent to landfill without serious difficulties or can be recycled into the cleaning processes after regeneration. In order to achieve the highest possible degree of separation for the individual contaminants mentioned above, it is usual for a number of cleaning processes to be combined with one another. For example, a dust-removal process can be linked to a process for the quasi-dry separation of gaseous, acidic pollutants (spray absorption), which can then be followed by an adsorption process for the removal of heavy metals and hydrocarbons and a nitrogen removal process. However, the present invention has the aim of removing as many of the above-mentioned pollutants as possible virtually quantitatively from the combustion flue gases in a single reaction step, since only then is it possible to minimize the investment and operating costs for the cleaning of combustion flue gases. Flue gas cleaning processes which pursue this aim with varying degrees of success are already known from the prior art.

Thus, for example, EP-B 0 253 563 discloses a process for the elimination of mercury vapour and vapour-form organic compounds as well as acidic constituents from a hot flue gas stream which also contains fly ash leaving a incinerator. In this known process, the flue gas stream to be cleaned is passed at a temperature of from 135 to 400° C. into a spray absorption chamber in which an aqueous liquid containing a basic absorbent is atomized. The flue gas cools in the spray absorber to from 180 to 90° C. due to evaporation of the water, and at the same time the acidic constituents $SO_2$ and HCl from the flue gas are bound, with a particulate material being formed which contains the products of the reaction of the basic absorbent and the acidic constituents of the flue gas as well as unreacted absorbent. The particulate reaction product, together with any fly ash present, is separated from the flue gases in a particle separator downstream of the spray absorption chamber. In the known process, it is also provided that powder-form activated carbon in an amount of from 1 to 800 mg/$Nm^3$ is introduced into the flue gas stream at least at one point upstream of the spray absorption chamber, in the spray absorption chamber or downstream of the spray absorption chamber, but upstream of the particle separator. The powder-form activated carbon is separated off in the particle separator together with the particulate reaction products. From today's point of view, a particular disadvantage of this known process is that both a spray absorber and a flow injection reactor, i.e. two process steps, are used to remove the pollutants.

DE-A 4415719 discloses a process for the removal of HF, HCl, $SO_2$, polyhalogenated hydrocarbons, mercury, mercury compounds and dust from a flue gas, in which the contaminated flue gas is brought into contact with an adsorbent in a reactor at a temperature of from 70 to 180° C. above the dew point, the gas/solid suspension is subsequently passed into a pre-separator, in which the majority of the solids are removed, the pre-cleaned gas/solid suspension is then passed into a final separator, into which the entire amount of the adsorbent is introduced and in which the suspended solids are removed virtually quantitatively, the solids obtained in the final separator are fed back into the reactor, and a sub-stream of the solids obtained in the pre-separator is fed back into the reactor, while a second sub-stream of the solids obtained in the pre-separator is discharged and sent to landfill. In this process, the flue gas is cooled to a temperature of from 70 to 180° C. before entry into the reactor or in the reactor by mixing with water, where the reactor is designed as a fluidized-bed reactor, flow injection reactor or spray absorber. The adsorbent consists of $Ca(OH)_2$ and/or CaO and has a mean particle diameter $d_{50}$ of from 5 to 500 µm. The adsorbent may contain from 2 to 20% by weight of activated carbon and/or zeolites. From today's point of view, this known process has the disadvantage that a pre-separator and a final separator are required to carry out the removal of the pollutant-loaded solids, and in addition the separation of the solids from the gas stream is particularly difficult if they have a relatively high content of $CaCl_2$ since this compound is hygroscopic and therefore results in solid encrustations in the separators since a sufficient amount of water, which is adducted by the $CaCl_2$, is present in the flue gas stream.

DE-A 4403244 discloses a process for cleaning oxygen-containing flue gases formed in the combustion of refuse, industrial waste and sewage sludge, in which mercury, mercury compounds and polyhalogenated hydrocarbons are removed from the flue gases by adsorption on zeolites. This process is characterized in that the flue gases are reacted with a mixture of naturally occurring zeolites for a reaction time of from 0.5 to 10 seconds in a gas/solid suspension above the dew point at a temperature of from 80 to 180° C. and a gas velocity of from 3 to 20 m/s, where the mean particle size $d_{50}$ of the zeolite mixture is from 5 to 50 µm and the mean suspension density of the gas/solid suspension is from 0.02 to 10 kg of solid/$Nm^3$ of flue gas. The mixture of naturally occurring zeolites may contain from 10 to 30% by weight of $CaCO_3$, CaO and/or $Ca(OH)_2$. This known process can be carried out in the circulating fluidized bed, with the gas velocity being from 3 to 8 m/s and the mean suspension density of the gas/solid suspension being from 2 to 10 kg of solid/$Nm^3$ of flue gas. This process has, in particular, the disadvantage that it is not able to remove the acidic pollutants HF, HCl, $SO_2$ and $SO_3$ substantially and that to this extent a further process step is absolutely necessary. This has the consequence that the combustion flue gas firstly has to be subjected to dust removal in a suitable device and then has to be substantially freed from the acidic, gaseous pollutants in a spray absorber before the heavy metals and polyhalogenated hydrocarbons and the remaining acidic pollutants can be removed.

The invention is based on the object of providing a process for the removal of dust, HF, HCl, $SO_2$, $SO_3$, heavy metals, heavy-metal compounds, polyhalogenated hydrocarbons and polycyclic hydrocarbons from combustion flue gases which effects the pollutant removal in only one process step, which furthermore produces a cleaned flue gas which does not exceed the limits prescribed by the 17th Ordinance for Implementation of the German Federal Emission Protection Act (Ordinance Regarding Incinerators for Waste and Similar Combustible Substances—17.BImSchV) of 23.11.1990, amended by the ordinance of 23.02.1999, and which, finally, produces a pollutant-loaded solids mixture which remains flowable and transportable and does not result in encrustations and caking either in the solids separator or in the transport systems. The invention is furthermore based on the object of providing a device for carrying out the process and of indicating a preferred use of the process and the device.

The object on which the invention is based is achieved by a process of the type mentioned at the outset, which is characterized in that the sorbent used is a mixture of $Ca(OH)_2$, at least one naturally occurring zeolite and a carbon-containing substance, where the mean particle size $d_{50}$ of the sorbent is from 2 to 50 µm, in that the treatment of the pollutant-containing combustion flue gases with the sorbent is carried out at from 120 to 180° C. in the presence of water/steam, in that the reactor is operated at a gas velocity of from 2 to 10 m/s, a mean residence time of the solids particles in the case of a single pass of from 1 to 10 seconds, and a solids circulation rate of from 10 to 100, where the gas/solid suspension present in the reactor has a mean suspension density of from 1 to 10 kg of solid/$Nm^3$ of flue gas, and in that the removal of the loaded sorbent in the separator is carried out by filtration.

The $Ca(OH)_2$ present in the sorbent has a purity of >98% and reacts with or absorbs the acidic pollutants HF, HCl, $SO_2$ and $SO_3$ with formation of the corresponding calcium salts. The salt formation proceeds relatively quickly since the water introduced into the reactor in liquid form firstly wets the sorbent particles and only evaporates thereafter, with the $Ca(OH)_2$ particles being activated with respect to their reactivity by the wetting with liquid water. The invention therefore expressly uses the term "water/steam". The naturally occurring zeolites and the carbon-containing substance adsorb the heavy metals and heavy-metal compounds present in the combustion flue gases as well as the polyhalogenated and polycyclic hydrocarbons. However, the natural zeolites present in the sorbent also do another job, i.e. at from 120 to 180° C. they adsorb water since their adsorption capacity for water at 20° C. is from 30 to 50 g/kg, while they are unable to adsorb any further water at from 220 to 230° C., meaning that their adsorption capacity for water at from 120 to 180° C. is still considerable. The adsorption processes proceed significantly more slowly than the salt-formation reactions. This has the consequence that the naturally occurring zeolites adsorb water from the gas/solid suspension, in particular in the upper part of the reactor, which has the very advantageous effect that the water is no longer adducted by the hygroscopic $CaCl_2$ and that the solids leaving the reactor do not bake on or cake, in particular in the separator; instead, they remain flowable. The solids circulation rate of from 10 to 100—the individual solids particles thus pass through the reactor from 10 to 100 times—in accordance with the invention ensures that a large amount of sorbent is always present in the reactor, meaning that the sorbent is in excess over the pollutants. This has the consequence that from 85 to 99% of the $Ca(OH)_2$ employed react with the gaseous, acidic pollutants and that by far the majority of the adsorption capacity of the naturally occurring zeolites and of the carbon-containing substance is utilized. The good flowability of the solids particles enables them to be separated off from the gas/solid suspension in the separator simply by filtration and means that, in particular, their partial recycling into the reactor is possible without problems. The combustion flue gas cleaning according to the invention in a circulating fluidized bed enables the pollutant limits prescribed in 17.BImSchV to be observed without problems and for the most part even bettered. The advantage of the process according to the invention is thus, in particular, that all the above-mentioned pollutants can be removed virtually completely in one process step, and with minimal equipment complexity.

In addition, it is particularly advantageous that the separated-off sorbent contains no $CaSO_3$, since this originally formed reaction product is oxidized quantitatively to $CaSO_4$ by the oxygen present in the combustion flue gas owing to the catalytic activity of the heavy metals present; no $SO_3^{2-}$ has been detected in the discharged sorbent. The discharged sorbent thus contains the pollutants $SO_2$ and $SO_3$ in the form of sulphates of calcium, where the calcium sulphates predominantly consist of $CaSO_4.0.5H_2O$. This hemihydrate of $CaSO_4$ solidifies on contact with water to form $CaSO_4.2H_2O$. The dust present in the discharged sorbent is therefore firmly bound if the discharged sorbent comes into contact with water, for example in a landfill site.

The circulating fluidized bed is designed as a circulation system and is distinguished by the fact that—in contrast to the classical fluidized bed, in which a dense phase is separated from the gas space above it by a clear density jump—distribution states without a defined boundary layer are present. A density jump between the dense phase and the gas space above it is non-existent in an expanded circulating fluidized bed; however, the solids concentration decreases constantly from bottom to top within the reactor. This has the consequence that absorption and adsorption processes are able to proceed throughout the reactor, since an adequate number of sorbent particles is always present, even in the upper part of the reactor. It has been found that the respirable dust particles—i.e. small dust particles having a mean particle diameter $d_{50}$ of <1 µm—are substantially adsorbed in the circulating fluidized bed by the relatively large particles of the sorbent through the action of van der Waal's forces. These adsorbates are advantageously not destroyed by the shear forces prevailing in the circulating fluidized bed, while relatively large solids agglomerates are broken down into the individual solids particles by the shear forces of the circulating fluidized bed, which likewise has an advantageous effect on the course of the process.

It is particularly advantageous in accordance with the invention for the sorbent to consist of from 75 to 96 parts by weight of $Ca(OH)_2$ having a mean particle diameter $d_{50}$ of from 2 to 5 µm, from 3 to 15 parts by weight of a carbon-containing substance having a mean particle diameter $d_{50}$ of from 10 to 30 µm, and from 1 to 10 parts by weight of at least one naturally occurring zeolite having a mean particle diameter $d_{50}$ of from 10 to 25 µm. A sorbent nature of this type effects optimum pollutant removal and ensures fault-free, continuous operation of the circulating fluidized bed.

The naturally occurring zeolite used in accordance with the invention is advantageously analcime, chabasite, clinoptilolite, faujasite, harmotome, mordenite or natrolite, it also being possible to use a mixture consisting of two or more of these substances. The carbon-containing substance used in accordance with the invention is advantageously open hearth coke or activated carbon, the open hearth coke firstly being inexpensive and secondly having a sufficiently high adsorption capacity for heavy metals, heavy-metal compounds and toxic hydrocarbons.

In a further embodiment of the invention, it is provided that the naturally occurring zeolite and/or the carbon-containing substance are doped with from 2 to 10% by weight of sulphur and/or at least one sulphur-containing compound. The doping is carried out by mixing the naturally occurring zeolite and/or the carbon-containing substance with sulphur or at least one sulphur-containing compound, where all substances have approximately the same particle diameter, or by impregnating the naturally occurring zeolite and/or the carbon-containing substance with a solution containing at least one sulphur-containing compound, and subsequently drying the solids impregnated in this way. The sulphur-containing compounds used are polysulphides of sodium, potassium or calcium, dithiocarbamates, trithiocarbonates or the sodium salt of trimercapto-S-triazine. The sulphur and the sulphur-containing compounds react with the heavy metals present in the combustion flue gas at elevated temperature with formation of sulphides.

In accordance with the invention, the recycled, pollutant-loaded sorbent is introduced into the pollutant-containing combustion flue gases upstream of the reactor, i.e. in the flue gas channel which runs into the reactor. In accordance with the invention, the pollutant-loaded, discharged sorbent is replaced by fresh sorbent, where the fresh sorbent is introduced into the pollutant-containing combustion flue gases upstream of the reactor—i.e. in the flue gas channel—and where the fresh sorbent and the recycled sorbent are introduced separately from one another into the pollutant-containing combustion flue gases.

By means of the two measures, intimate mixing of the fresh and recycled, loaded sorbent is advantageously achieved even before entry into the reactor. It has been found that the separate feed of the fresh and recycled sorbent into the pollutant-containing combustion flue gas upstream of the reactor enables avoidance of the undesired agglomeration of the solids that occurs when fresh and recycled sorbent are introduced together into the combustion flue gas and are already mixed before their introduction. It has furthermore been found that all solids particles in the stream of pollutant-containing combustion flue gas are heated to a temperature above the working temperature prevailing in the reactor before they are introduced into the reactor, which results in solids agglomeration being prevented and the recycled zeolite particles being dried so that they are again able to take up water in the reactor. Finally, it has been found that a well-mixed gas/solid suspension is already formed in the combustion flue gas upstream of the reactor and then effects very uniform solids distribution over the entire reactor cross section in the reactor itself.

In a further embodiment of the invention, it is provided that the amount of fresh sorbent supplied is regulated in accordance with the total amount of the pollutants HCl and $SO_2$ and the amount of $Ca(OH)_2$ which is stoichiometrically necessary for their binding. Carrying out the process in this way in accordance with the invention enables, in an advantageous manner, very rapid reaction to changes in the amount and composition of the pollutant-containing combustion flue gases, which means that an adequately large amount of fresh sorbent is always present in the reactor.

The process according to the invention operates particularly advantageously if the pollutant-containing combustion flue gases have a temperature of from 200 to 280° C. upstream of the reactor and are cooled to a temperature of from 120 to 180° C. in the reactor by addition of water, where the addition of water takes place in the lower part of the reactor, and the water is introduced into the reactor in the form of drops having a diameter of <40 µm. The feed of the water in finely divided form into the lower part of the reactor crucially accelerates the salt-formation reaction of the acidic, gaseous pollutants with the $Ca(OH)_2$, since the reactivity of the $Ca(OH)_2$ is activated by the water. An adequate reaction time is then available for adsorption of the excess water by the naturally occurring zeolite present in the sorbent, so that the hygroscopic properties of the $CaCl_2$ are suppressed and cannot have an adverse effect with respect to the operation of the circulating fluidized bed. It is particularly advantageous for the pollutant-containing combustion flue gases to be cooled to a temperature of from 130 to 160° C. in the reactor.

In a further embodiment of the invention, it is proposed that the loaded sorbent present in the return line and the fresh sorbent are each fluidized and transported by addition of a sub-stream of the cleaned combustion flue gases. This measure effects problem-free introduction of the sorbent into the combustion flue gas upstream of the reactor without the significant operating costs for this, in particular for a fluidization gas, being entailed. However, pre-warmed air can also be used for the fluidization and for the transport of the fresh and loaded, recycled sorbent.

In order to maintain the operating conditions pre-specified in accordance with the invention in the circulating fluidized bed, it is provided, in the case of partial-load operation of the incinerator in accordance with the invention, that the operating conditions in the circulating fluidized bed are kept constant in the case of a change in the amount of combustion flue gases to be cleaned (partial-load operation) by addition of a sub-stream of the cleaned combustion flue gases. Carrying out the process in this way safeguards continuous operation and prevents undesired frequent start-up and shut-down of the cleaning plant.

Finally, it is provided in a further embodiment of the invention that the cleaned combustion flue gases leaving the separator are either released into the atmosphere or fed to a process for removal of the oxides of nitrogen. The cleaned flue gases can be released into the atmosphere if the combustion process is carried out in such a way that only small amounts of $N_2O$, NO and/or $NO_2$ are formed. By contrast, it is necessary to remove the oxides of nitrogen from the cleaned combustion flue gases if they have been formed in larger amounts during the combustion process. Removal of the oxides of nitrogen can be carried out by known processes, which should be installed down-stream of the process according to the invention (for example nitrogen removal by an SCR process, which operates at relatively low temperatures and with catalysts).

Alternatively, it is provided in a further embodiment of the invention that the pollutant-containing combustion flue gases are fed to a process for the removal of the oxides of nitrogen, for example a known SNCR process, which operates at high temperatures and without catalysts, immediately after leaving the incinerator and before entering the flue gas channel.

The object on which the invention is based is furthermore achieved by the provision of a device for carrying out the process according to the invention, which consists of a reactor, a separator and a return line and which is characterized in that the base of the reactor is designed as a Venturi tube, in that one or more nozzles for the introduction of the water are arranged immediately above the diffuser of the Venturi tube and distributed over the reactor cross section, in that the separator is designed as a bag filter containing a low-pressure jet pulse device, in that the return line is designed as an inclined fluidization channel which runs into the flue gas channel connected to the reactor and whose base has a gas-permeable fabric through which the gas serving for fluidization of the recycled sorbent is introduced into the fluidization channel, and in that a second inclined fluidization channel which serves for the feed of the fresh sorbent and whose base has a gas-permeable fabric through which the gas serving for fluidization of the fresh sorbent is introduced into the second fluidization channel runs into the flue gas channel.

It has been found that a Venturi tube is particularly suitable for the production of the gas/solid suspension present in the reactor and favours transport of the fresh and recycled sorbent from the two fluidization channels into the reactor since the stream of pollutant-containing combustion flue gas readily sucks the solids particles out of the fluidization channels through the action of the Venturi tube (water-jet pump principle) and conveys them. The Venturi tube has an aperture angle of from 30 to 50° to the diffuser, and the diffuser extends over the cross section of the reactor. In the case of large reactor cross sections, a plurality of bundled Venturi tubes can run into the diffuser. The arrangement of the nozzles for the introduction of water selected in accordance with the invention effects uniform and rapid distribution of the water in the lower part of the reactor, which means that a local temperature decrease in the reactor cannot occur. The bag filter serving as solids separator facilitates virtually quantitative removal of all solids particles, i.e. both the dust particles introduced with the combustion flue gas and the sorbent particles. It is therefore not necessary to use a plurality of different solids separators, which has an advantageous effect both with respect to the investment costs and with respect to the operating costs. The bag filter is cleaned in accordance with the invention by means of a low-pressure jet pulse device, which does not result in operational interruptions since the solids mixture filtered off does not cake and can easily be detached from the filter bags. The low-pressure jet pulse device is only operated at an excess pressure of from 0.6 to 0.8 bar, which prevents the disadvantageous results of the Joule-Thomson effect (cooling of the gas on its decomposition and partial condensation of the water present in the gas). The return line in the form of an inclined fluidization channel ensures problem-free recycling of the sub-stream of pollutant-loaded sorbent, and the fresh sorbent is also readily introduced into the flue gas stream via the second inclined fluidization channel.

In accordance with the invention, the low-pressure jet pulse device is operated with pre-warmed air or with a sub-stream of the cleaned combustion flue gas, these gases serving for cleaning the bag filter (back-flushing gas).

It has proven particularly advantageous in accordance with the invention for the line for the introduction of the gas/solid suspension into the bag filter to run into the lower part of the bag filter, where at least one baffle-plate separator, which acts as inertial separator and which the gas/solid suspension hits, is arranged. This results in a large part of the solids particles being removed from the gas/solid suspension even before the actual filtration operation, which enables the filter area to be reduced. The baffle-plate separator changes the flow direction of the gas/solid suspension.

In a further embodiment of the invention, it is furthermore provided that the loaded sorbent arising at the base of the bag filter is discharged via at least one metering roll. The metering roll has proven particularly successful for solids recycling since it enables a rapid change in the amount of solid discharged, and a proportional amount of solid matched to the varying crude-gas stream can therefore be recycled. In the case of a small design, the metering roll enables high solids throughput.

Finally, the object on which the invention is based is achieved in that the process according to the invention and the device according to the invention are used for cleaning flue gases arising in the combustion of refuse, hazardous waste, industrial waste and sewage sludge. This is because both the process and the device are so flexible in the way they are operated that their operation can be matched to the rapidly changing flue gas amounts and flue gas compositions in waste combustion without the pre-specified pollutant limits in the cleaned combustion flue gas being exceeded.

The subject-matter of the invention is explained in greater detail below with reference to the drawing and an illustrative embodiment.

BRIEF DESCRIPTION OF THE DRAWING

FIG. 1 is a schematic illustration of a reactor and process according to the present invention.

Domestic and industrial refuse is burned in the incinerator 1, with a pollutant-containing combustion flue gas being formed. The heat of combustion is removed from the pollutant-containing combustion flue gas in a heat exchanger, which is not shown in the drawing, to the extent that the flue gas leaves the incinerator 1 at a temperature of about 230° C. The pollutant-containing combustion flue gas is discharged from the incinerator 1 via the flue gas channel 2 and enters the reactor 3.

The reactor 3 is in the form of a cylindrical tube whose base is designed as a Venturi tube 24 with a diffuser 25. One or more nozzles through which the water 5 carried in the line 4 is introduced into the reactor 3 in finely divided form, are arranged above the diffuser 25 over the reactor cross section, depending on the size of the cross section. The amount of water is set in such a way that the pollutant-containing combustion flue gas is cooled to a temperature of about 145° C. In the reactor 3, the gas has a flow velocity of about 5 m/s. The recycled sorbent is fed to the flue gas channel 2 via line 23, where it is in fluidized form, and is entrained by the stream of pollutant-containing combustion flue gas carried in the flue gas channel 2 and is introduced into the reactor 3 via the Venturi tube 24. The fresh sorbent is fed to the flue gas channel 2 via line 27, where it is in fluidized form. The fresh and recycled sorbent are mixed with one another in the flue gas channel 2. A gas/solid suspension forms, with a mean suspension density of about 5 kg/Nm$^3$ in the reactor 3. The gas/solid suspension has a mean residence time of about 8 seconds in the reactor 3. During this time, the pollutants present in the combustion flue gas are bound virtually quantitatively by absorption and adsorption onto the sorbent. In addition, the naturally occurring zeolite present in the sorbent takes up some of the water 5 in the reactor 3 by adsorption. The naturally occurring zeolite used is preferably a mixture of from 10 to 30% by weight of mordenite and from 90 to 70% by weight of clinoptilolite. The carbon-containing substance used is open hearth coke.

The gas/solid suspension leaves the reactor 3 via line 6 and is introduced into the lower part of the bag filter 7, where it firstly hits the baffle-plate separator 8. A large part of the solids is separated off at the baffle-plate separator 8 and flows off into the lower part of the bag filter 7. The gas/solid suspension then hits the bag filter elements 9, the solids particles being filtered off and accumulating on the bag filter elements 9, where they form a filter cake. The combustion flue gas freed from the solids particles and the gaseous pollutants passes through the bag filter elements 9 and enters the upper part of the bag filter 7, which is separated from the lower part of the bag filter 7. The cleaned combustion flue gas leaves the upper clean-gas part of the bag filter 7 via line 10.

The low-pressure jet pulse device 11, which serves for cleaning the bag filter elements 9, is arranged in the upper part of the bag filter 7. The low-pressure jet pulse device 11 is a line system whose exit apertures project into the bag filter elements 9. The low-pressure jet pulse device 11 is supplied via line 12 with pre-warmed air, which is produced in the compressor 29 and acts, in the form of a pulse, on the inner surfaces of the bag filter elements 9 in such a way that the filter cake located on the outside of the bag filter elements 9 is detached and falls into the lower part of the bag filter 7. The cleaning process is repeated at time intervals corresponding to the increase in filter resistance, enabling the bag filter 7 to be operated continuously. A temperature of from about 135 to 140° C. prevails in the bag filter 7, which means that the temperature cannot fall below the dew point of the combustion flue gas. When the cleaned combustion flue gas carried in line 10 has a dust content of <3 mg/Nm$^3$, a sub-stream of this clean gas can be used instead of the pre-warmed air as back-flushing gas for the low-pressure jet pulse device 11.

The separated-off solid, which consists of the dust present in the combustion flue gas and the pollutant-loaded sorbent, accumulates at the base of the bag filter 7. Some of the solid is removed from the bag filter 7 via the star wheel discharge device 14 and line 16 and enters the storage bunker 17. Instead of the star wheel discharge device 14, it is also possible to use a metering roll. The discharged solid is sent to landfill as hazardous waste. A further part of the solid is removed from the bag filter 7 via the metering roll 15 and enters the fluidization channel 19 via line 18. The fluidization channel 19 is inclined at an angle of 10°. A sub-stream of the cleaned combustion flue gas, which is carried in line 22, is introduced above the base of the fluidization channel 19 as fluidization gas. This fluidization gas converts the solids carried in the fluidization channel 19 into a fluidized, flowable state. This solid enters the flue gas channel 2 via line 23.

The fresh sorbent enters the second fluidization channel 26, which has an inclination angle of 10°, from the storage bunker 20 via line 21. A sub-stream of the cleaned combustion flue gas, which is carried in line 28, is introduced as fluidization gas above the base of the second fluidization channel 26. The fluidization gas converts the fresh sorbent into a fluidized, flowable state. The fluidized, fresh sorbent passes through line 27 into the flue gas channel 2, where it is mixed with the recycled sorbent with formation of the gas/solid suspension, which enters the reactor 3.

The device consisting of the reactor 3, the bag filter 7 and the fluidization channels 19 and 26 is operated in such a way that the circulation rate of the recycled sorbent is between 40 and 50. This results in the sorbent collected in the storage bunker 17 being substantially loaded with pollutants, since more than 90% of the $Ca(OH)_2$ have reacted with the acidic, gaseous pollutants with salt formation. The cleaned combustion flue gas carried in line 10 is virtually free from dust and gaseous pollutants; it can subsequently be fed to a nitrogen removal plant, in which the oxides of nitrogen are removed.

If the refuse incinerator 1 has to be reduced to partial-load operation, a sub-stream of the cleaned combustion flue gas is introduced into the flue gas channel 2 via line 13 in order to maintain the operating conditions of the circulating fluidized bed. This enables continuous operation of the circulating fluidized bed to be continued under optimum fluid-dynamic conditions even in the case of partial-load operation of the refuse incinerator 1.

The process shown in the drawing has been employed on an industrial scale for cleaning the flue gas from a refuse incinerator over an extended period. During the trials of the process according to the invention, the operating results shown in the table were maintained continuously for an operating time of 1200 hours. During this time, no operating faults occurred. In particular, a sufficiently cleaned flue gas and a solids mixture which could be handled readily and transported to a landfill site without problems, especially as it contained no $CaSO_3$, were produced during the entire operating time.

1) Pollutant-containing Flue Gas from a Refuse Incinerator

| | |
|---|---|
| Amount | 100 000 Nm³/h |
| Temperature | 230° C. |
| Dust | 2000-10 000 mg/Nm³ |
| HF | 5-60 mg/Nm³ |
| HCl | 500-2500 mg/Nm³ |
| $SO_2$ | 100-800 mg/Nm³ |
| $SO_3$ | 5-100 mg/Nm³ |
| Hg | 0.1-1 mg/Nm³ |
| Cd | 0.1-1 mg/Nm³ |
| Dioxins, furans [1] | 1-10 ng TE/Nm³ [3] |
| PCB, PCP, PCA [2] | 1-10 µg/Nm³ |
| Organic carbon [4] | <20 mg/Nm³ |

2) Cleaned Flue Gas from a Refuse Incinerator

| | |
|---|---|
| Temperature | 140° C. |
| Dust | <5 mg/Nm³ |
| HF | not detectable |
| HCl | <4 mg/Nm³ |
| $SO_2$ | <15 mg/Nm³ |
| $SO_3$ | not detectable |
| Hg | <0.02 mg/Nm³ |
| Cd | not detectable |
| Dioxins, furans [1] | <0.1 ng TE/Nm³ [3] |
| PCB, PCP, PCA [2] | <0.1 µg/Nm³ |
| Organic carbon [4] | <0.1 mg/Nm³ |

Footnotes
[1] Total content of polyhalogenated dibenzodioxins and dibenzofurans
[2] Total content of polychlorinated biphenyls (PCBs), polychlorinated phenols (PCPs) and polychlorinated aromatics (PCAs)
[3] TE = toxic equivalent as defined in 17.BImSchV, annex
[4] Includes polycyclic hydrocarbons

The invention claimed is:

1. A method for the separation of the pollutants, dust, HF, HCl, $SO_2$, $SO_3$, heavy metals, heavy-metal compounds, polyhalogenated hydrocarbons and polycyclic hydrocarbons from combustion flue gases containing such pollutants by a process comprising treating the pollutant-containing combustion flue gases with a sorbent in a circulating fluidized bed comprising a reactor, a separator and a return line, wherein the pollutant-laden sorbent is separated off from a gas/solid suspension in the separator and in part recycled to the reactor via the return line and in part discharged, wherein the recycled sorbent is introduced upstream of the reactor, via the return line, separately from the fresh sorbent, wherein the sorbent is a mixture of $Ca(OH)_2$, at least one naturally occurring zeolite, and a carbon-containing substance, wherein the sorbent has a mean particle size $d_{50}$ of 2 to 50 µm, the process is carried out at 120 to 180° C. in the presence of steam wherein water is added in a lower part of the reactor in the form of drops having a diameter of <40 µm, the reactor is operated at a gas velocity of 2 to 10 m/s, and a mean residence time of the solids particles in a single pass of 1 to 10 seconds, wherein the gas/solid suspension present in the reactor has a mean suspension density of 1 to 10 kg of solid/Nm³ flue gas, wherein the separation of the loaded sorbent in the separator is carried out by filtration, wherein the process is operated at a solids circulation rate of 10-100, and the loaded sorbent located in the return line and a fresh sorbent are each fluidized and transported by adding a part-stream of the cleaned combustion flue gases or adding pre-warmed air, wherein the operating conditions in the circulating fluidized bed are kept constant in the event of a change in the amount of combustion flue gases to be cleaned (partial load operation) by adding a part-stream of the cleaned combustion flue gases.

2. The method as claimed in claim 1, wherein the sorbent comprises 75 to 96 parts by weight of $Ca(OH)_2$ with a mean particle diameter $d_{50}$ of 2 to 5 µm, 3 to 15 parts by weight of a carbon-containing substance with a mean particle diameter $d_{50}$ of 10 to 30 gm and 1 to 10 parts by weight of at least one naturally occurring zeolite with a mean particle diameter $d_{50}$ of 10 to 25 µm.

3. The method as claimed in claim 1, wherein the naturally occurring zeolite used is analcime, chabasite, clinoptilolite, faujasite, harmotome, mordenite and/or natrolite.

4. The method as claimed in claim 1, wherein the carbon-containing substance used is open hearth furnace coke or activated carbon.

5. The method as claimed in claim 1, wherein the naturally occurring zeolite and/or the carbon-containing substance are doped with 2 to 10% by weight of sulphur and/or at least one sulphur-containing compound.

6. The method as claimed in claim 1, wherein the amount of fresh sorbent supplied is regulated according to the sum of the pollutants HCl and $SO_2$ and the amount of $Ca(OH)_2$ which is stoichiometrically necessary for binding thereof.

7. The method as claimed in claim 1, wherein the pollutant-containing combustion flue gases have a temperature of 200 to 280° C. upstream of the reactor and are cooled to a temperature of 120 to 180° C. in the reactor by addition of water, wherein the addition of water takes place in the lower part of the reactor and the water is introduced into the reactor in the form of drops with a diameter of <40 µm.

8. The method as claimed in claim 1, wherein the operating conditions in the circulating fluidized bed are kept constant in the event of a change in the amount of combustion flue gases to be cleaned (partial-load operation) by addition of a part-stream of the cleaned combustion flue gases.

9. The method as claimed in claim 1, wherein the cleaned combustion flue gases leaving the separator are either released into the atmosphere or are fed to a method for separating out of the oxides of nitrogen.

10. The method as claimed in claim 1, further comprising the step of the pollutant-containing combustion flue gases being fed to a method for separating out oxides of nitrogen immediately after leaving an incinerator and before entering a flue gas duct.

* * * * *